C. W. TREMAIN.
Improvement in Wheels for Traction-Engines.
No. 114,369. Patented May 2, 1871.
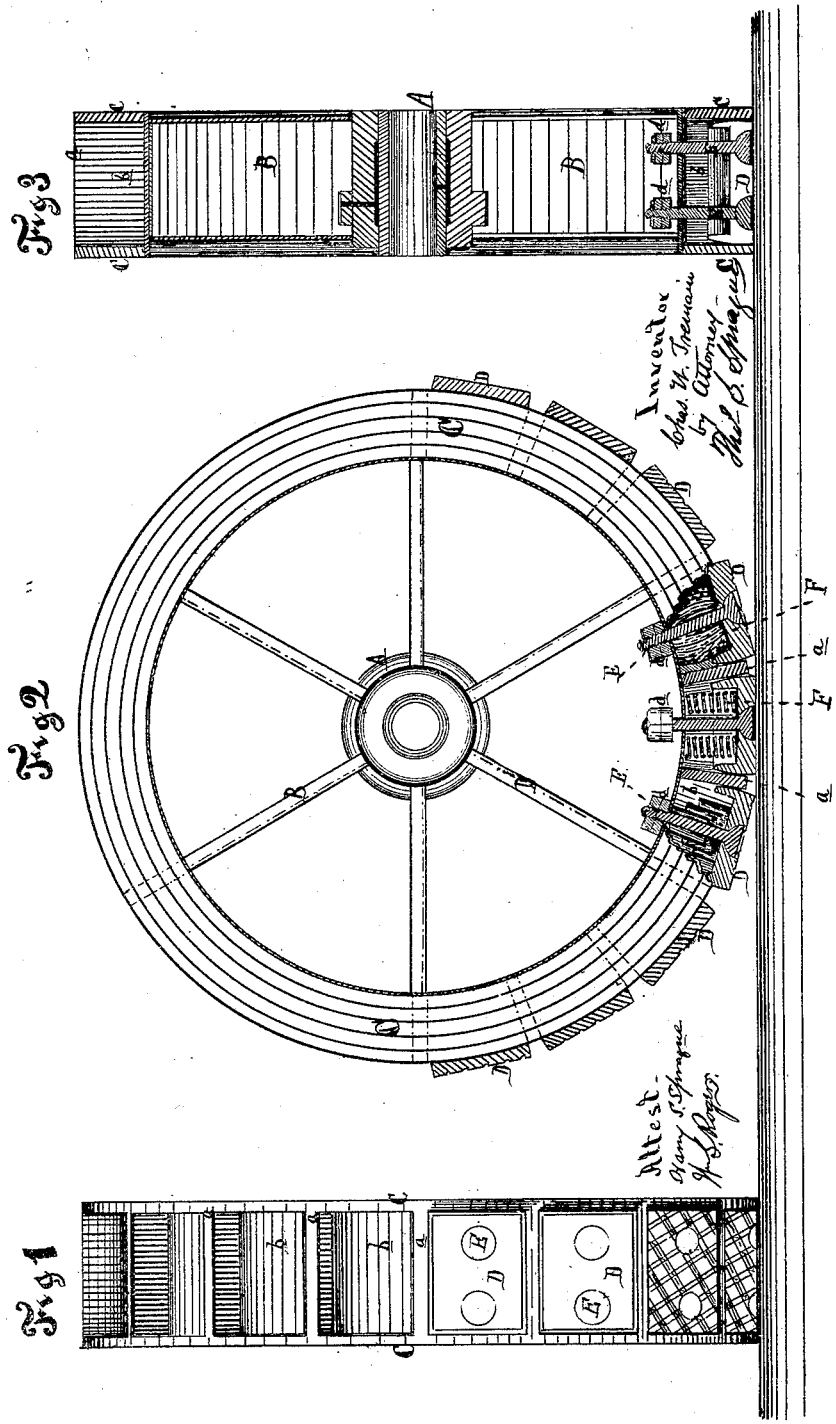

United States Patent Office.

CHARLES W. TREMAIN, OF CHICAGO, ILLINOIS.

Letters Patent No. 114,369, dated May 2, 1871.

IMPROVEMENT IN WHEELS FOR TRACTION-ENGINES.

The Schedule referred to in these Letters Patent and making part of the same.

*To whom it may concern:*

Be it known that I, CHARLES W. TREMAIN, of Chicago, in the county of Cook and State of Illinois, have invented a new and useful Improvement in Wheels for Traction or Road-Locomotives; and I do declare that the following is a true and accurate description thereof, reference being had to the accompanying drawing and to the letters of reference marked thereon and being a part of this specification, in which—

Figure 1 is an edge elevation;

Figure 2 is a side elevation, partially in section, showing the arrangement of the springs and radial bolts; and Figure 3 is a vertical section on the line x x in fig. 2.

Like letters refer to like parts in each figure.

This invention has for its object an improvement in the construction of the tire for wheels of traction-engines and road-locomotives; and It consists in the peculiar arrangement of segmental plates to the wheel within chambers or recesses formed in its periphery; the said tire-plates being loosely held therein by radial bolts passing through them and the internal periphery of the felly, and the interposition of springs between the bottom of each recess and the internal face of each segmental plate, as more fully hereinafter set forth.

In the drawing—

A represents the hub;

B, the spokes; and

C, the double-flanged felly of my wheel.

a are transverse partitions between the flanges of the felly, dividing it into chambers or recesses b.

D are segmental plates or shoes loosely held in the recesses b by radial bolts E, whose heads are ball-countersunk in the outer faces of the shoes, and pass through the chambers b and the internal periphery of the felly, where they are secured by jam-nuts d or other suitable means.

Interposed between the bottom of each of the recesses b and the inner faces of the tire-plates are to be placed suitable springs, F, which may be volute coil or rubber, either coiled around the radial bolts or arranged on either side.

What I claim as my invention, and desire to secure by Letters Patent, is—

1. The construction of the fellies of traction-wheels with double flanges, the same being divided into recesses or chambers for the reception of segmental shoes, substantially as herein set forth.

2. The construction and arrangement of the shoes D and radial bolts E within the double-flanged felly of a traction-wheel, with a suitable spring backing interposed between the inner faces of each segmental shoe and the bottom of its respective recess, substantially as and for the purpose set forth.

CHARLES W. TREMAIN.

Witnesses:
HARRY S. SPRAGUE,
W. S. ROGERS.